United States Patent [19]

Inoue et al.

[11] Patent Number: 4,911,571
[45] Date of Patent: Mar. 27, 1990

[54] DEVICE FOR PREVENTING DRYING OF INK IN WRITING INSTRUMENT

[75] Inventors: Shigeyasu Inoue; Tatsuya Ozu; Hiroyoshi Yamamoto, all of Osaka, Japan

[73] Assignee: Sakura Color Products Corporation, Osaka, Japan

[21] Appl. No.: 786,361

[22] Filed: Oct. 11, 1985

Related U.S. Application Data

[63] Continuation of Ser. No. 555,001, Nov. 21, 1983, abandoned.

[30] Foreign Application Priority Data

Dec. 28, 1982 [JP] Japan .................. 57-201512[U]
Apr. 18, 1983 [JP] Japan ...................... 58-58306

[51] Int. Cl.4 .................. B43K 9/00; B43K 5/00; B43K 7/00; B43K 8/00
[52] U.S. Cl. .................................. 401/202; 401/213; 401/243; 401/262; 401/269
[58] Field of Search ............ 401/192, 195, 202, 213, 401/245, 243, 247, 269, 262; 206/204

[56] References Cited

U.S. PATENT DOCUMENTS

| 752,917 | 2/1904 | Morse ............................ 401/202 |
| 962,053 | 6/1910 | von Rottenburg ............ 401/202 X |
| 2,673,362 | 3/1954 | Robinson ...................... 401/202 X |
| 4,191,482 | 3/1980 | Ploeger ........................... 206/204 X |

FOREIGN PATENT DOCUMENTS

| 2509978 | 9/1976 | Fed. Rep. of Germany ...... 401/202 |
| 887689 | 8/1943 | France ............................. 401/202 |
| 48-26590 | 8/1973 | Japan . |
| 6613097 | 3/1967 | Netherlands .................... 401/245 |
| 16275 | of 1915 | United Kingdom ............ 401/195 |
| 746188 | 3/1956 | United Kingdom ............ 401/192 |

Primary Examiner—Steven A. Bratlie
Attorney, Agent, or Firm—Wenderoth, Lind & Ponack

[57] ABSTRACT

A device for preventing drying of ink in a writing instrument, in particular, a writing instrument provided with a tubular holder made of synthetic resin. The writing instrument is internally provided with a tubular ink-cartridge containing ink and a liquid retainer impregnated with liquid whose vapor pressure is higher than that of the liquid in the ink in the ink-cartridge, provided in an inner space of the holder so as to control evaporation of ink from the cartridge by the use of vapor evaporating from the impregnated retainer.

7 Claims, 1 Drawing Sheet

DEVICE FOR PREVENTING DRYING OF INK IN WRITING INSTRUMENT

This is a continuation, of now abandoned application Ser. No. 555,001, filed Nov. 21, 1983.

BACKGROUND OF THE INVENTION

The present invention relates to a device for preventing drying of ink to be used in a writing instrument such as a fountain pen, marking pen, or ball-point pen internally provided with an ink-cartridge containing volatile ink.

Generally, a writing instrument using ink is provided with an ink-cartridge, which contains ink, within the holder and a penpoint at the end thereof.

A writing instrument of this kind has a drawback resulting in total or partial loss of applicability thereof to writing due to evaporation of solvent contained in the ink while kept unused for a long time extending from the time when the instrument is delivered by the maker to that when bought by the user or passing while possessed by the user.

In the case a writing instrument is made of plastic material, however tightly the cap is fitted on the holder thereof, total or partial loss of applicability of the instrument to writing is unavoidable because of the nature of the plastic material permitting permeation of vapor of solvent when the instrument is unused for a long term.

To overcome the above problem, an attempt has been made to reduce dry of the ink in accordance with which a liquid retainer internally impregnated with liquid is held in the case of the writing instrument so that drying of ink is controlled by evaporation of solvent within the case.

However, nothing has been examined about a problem concerning the relationship between vapor pressure of the ink and that of the liquid and by reason that the vapor pressure of the liquid is lower than that of ink, solvent in the ink sometimes evaporates earlier than the liquid in order to maintain equilibrium of vapor pressure of ink and liquid in an air-tight case, and is absorbed by the liquid retainer contrary to the purpose, thereby interrupting the effect of preventing drying of ink.

An object of the present invention is to provide a device capable of preventing drying of ink in a writing instrument for a long period of time.

Another object of the present invention is to provide a device capable of preventing development of opacity in the transparent holsder of the writing instrument so as to permit constant observation of the degree of ink consumption in the ink-cartridge and maintain good appearance of the instrument.

BRIEF DESCRIPTION OF THE DRAWINGS

These and other objects of the present invention will be understood more detailedly upon consideration of the following description with reference to the appended drawings showing embodiments of the present invention.

DETAILED DESCRIPTION OF THE PREFERRED EMBODIMENTS

Figure 1:
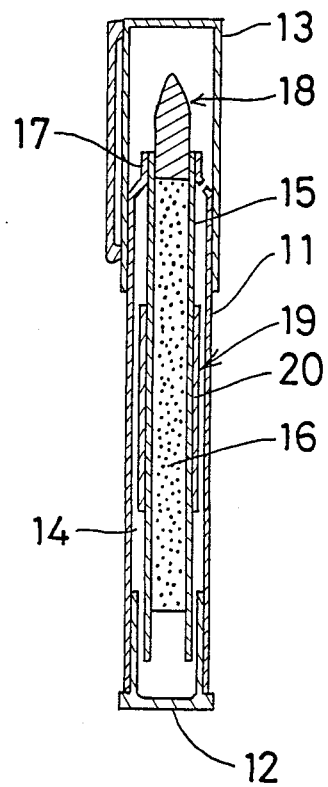
FIG. 1 is a vertical sectional view of a first embodiment of the present invention.

In the first embodiment of a writing instrument shown in FIG. 1, a tail plug 12 is tightly fitted into the end of the holder 11 and a cap 13 is detachably fitted on the front end of the holder 11.

These parts are all made of thermoplastic synthetic resin such as polystyrene. However, the cap 13 may be made of metal.

An ink-cartridge 15 inserted into the holder 11 while leaving surrounding space 14 therearound contains ink 16 therewithin and is air-tightly retained by the reduced end of the holder 11 serving as a pen tip retaining part 17, the tip thereof being provided with a marking pen point 18 to be impregnated with ink which oozes therefrom by capillary action.

In the writing instrument as described above, a drying-preventive device 19 for ink 16 is disposed in the inner space 14 of the holder 11.

The drying-preventing device 19 is composed of a retainer 20 made of foamy material such as sponge impregnated with a liquid drying-preventive agent whose vapor pressure is formulated to be higher than that of the ink, and is disposed to enclose the periphery of the ink-cartridge 15.

In a writing instrument using water base ink, the ink is constituted of dyestuff or pigment, water-soluble resin, water, and a hygroscopic agent such as ethylene glycol or glycerol, and the drying-preventive agent may be constituted of water and hygroscopic agent such as ethylene glycol or glycerol or a substance such as calcium chloride to lower the vapor pressure of the water.

The vapor pressure of the drying-preventive agent can be raised to a level greater than that of the liquid portion of the ink by increasing the proportion of the abovesaid substance relative to the water in the ink to be greater than that in the drying-preventive agent.

Therefore, when the writing instrument provided with a drying-preventive device 19 is kept unused, water in the drying agent first evaporates from the drying-preventive device 19 because of relatively high evaporation speed thereof and fills the space 14 in the holder 11, thereby permitting only a small quantity of water in ink 16 in the cartridge 15 to evaporate.

Vapor in the space 14 permeates the tubular holder 11 made of synthetic resin material and evaporates off while the writing instrument is kept unused; however, the permeating vapor replaced by vapor evaporating from water in the drying-preventive agent in almost the same quantity as that lost by permeation from the holder 11, whereby the space 14 is kept filled with vapor and consequently water in ink 16 continues to evaporate at a constant slow rate.

Since the water content of ink 16 begins evaporating to a substantial degree only subsequent to complete evaporation of the entire water content in the drying-preventive agent, the writing instrument is satisfactorily used for writing even after kept unused for a long term.

In the first embodiment of the present invention, a drying-preventive device 19 is disposed to enclose the periphery of an ink-cartridge 15 and, as a result, a space for the drying-preventive device 19 can be reduced and also the ink-cartridge 15 can be so long as to extend over almost entire length of the holder 11, whereby a quantity of ink contained therein may be large.

Figure 2:
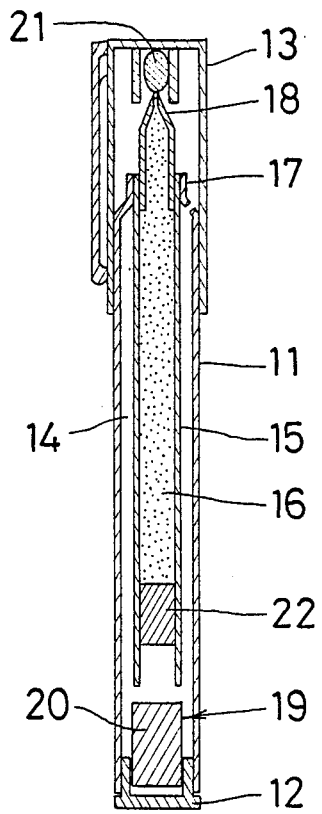
FIG. 2 is a vertical sectional view of a second embodiment of the present invention.

Now, the second embodiment shown in FIG. 2 will be described.

The same reference numerals as those used in describing the first embodiment are applied to the same parts in this second embodiment for simplification of description and different points only will be described.

A pen point 18 attached to the end of ink-cartridge 15 is ball-pointed and the end of pen point 18 is pressed to a tightly closing means 21 made of elastic material such as rubber fitted in the cap 13 so as to prevent evaporation of solvent from the end portion of the pen point 18. The tightly closing means 21 may be in the form of a film of synthetic resin to cover the end of the pen point 18.

An agent 22 for preventing reverse flow of ink 16 and constituted of a viscous substance insoluble in ink 16 fills the end opening of the ink-cartridge 15 which has been filled up with ink 16.

A drying-preventive device 19 comprising a liquid-retaining piece 20 made of a short tubular foamy material impregnated with drying-preventive agent is fixed to the tail plug 12. The relation between ink 16 and drying-preventive agent with respect to vapor pressure is entirely identical with that in the case of the first emboidment.

In this second embodiment, evaporation of the water content of the ink from the ink-cartridge 15 to the space 14 does not occur at all and the life of writing instrument can be prolonged.

In the second embodiment, when the writing instrument, if containing water base ink and comprising a transparent synthetic resin-made holder, is subjected to any impact, a drying-preventive agent contained in the retainer 20 of the drying-preventive device 19 splashes, sticks to, and aggregates at the inner periphery of the transpaent holder 11, thereby possibly causing the degree of ink consumption in the cartridge 15 to be invisible.

In view of the above, in the third embodiment of the present invention, vapor pressure of the drying-preventive agent is raised higher than that of ink 16 and additionally, the quality of this agent is compositionally improved.

As an agent to impregnate the retainer 20, such a kind of drying-preventive one as higher than ink 16 in vapor pressure and having surface tension equal to or below 40 dyne/cm at the temperature 20° C. is used so as to pevent the holder from being opacified by splashes of the drying-preventive agent caused by extraneous impact.

An example of substantial composition of a drying-preventive agent is shown as follows:

| | |
|---|---|
| Ethylene glycol | 10.0 parts by weight |
| Water | 88.8 parts by weight |
| Sodium benzoate (preservative) | 1.0 parts by weight |
| Noigen EA 112 | 0.2 parts by weight |
| (Prepared by Dai-ichi Kogyo Seiyaku Co., Ltd.; Polyethylene glycol octylphenylether) | |
| Surface tension | 30.7 dyne/cm (at 20° C.) |

EXAMPLE 2

| | |
|---|---|
| Ethylene glycol | 20.0 parts by weight |
| Water | 78.8 parts by weight |
| Sodium benzoate | 1.0 parts by weight |
| Neocol P | 0.2 parts by weight |
| (Prepared by Dai-ichi Kogyo Seiyaku Co., Ltd.; Dailkylsulpho saccinic acid ester sodium salt) | |
| Surface tension | 26.3 dyne/cm (at 20° C.) |

As is apparent from the third embodiment, by adapting the surface tension of the drying-preventive agent to be equal to or below 40 dyne/cm, the drying-preventive agent does not return into small droplets on the inner periphery of the holder 11 but generates a favorable wetting phenomenon without causing opacity in the holder 11, thereby enabling full observation of the outer part of the ink-cartridge 15.

This third embodiment significantly demonstrates a practical utility of the present invention in that the drying-preventive agent can simply and inexpensively be improved in quality by adding only a small quantity of surfactant.

The present invention has been described heretofore with respect to embodiments in which water base ink is used; however, the invention may be applicable to embodiments using the so-called oily ink, too, in which organic solvent instead of water is used as a main constituent.

In an example of the above composition, when constituents of ink are dyestuff resin, ethyl cyclohexans, and ethanol, the purpose may be fulfilled by preparing a drying-preventive agent with ethyl cyclohexane and ethanol so that these constituents are equal to each other in quantity ratio.

When oily ink is used, the plastic transparent holder is prevented from opacifying even if subjected to splashes of ink, thanks to low surface tension of this ink.

What is claimed is:

1. A writing instrument comprising:
   a pen point;
   a tubular holder having peripheral walls;
   an ink-cartridge containing ink having a first liquid therein, in fluid communication at one end thereof with said pen point disposed within said holder and spaced from said walls so as to define a closed space between said walls and said cartridge surrounding said ink-cartridge;
   a backflow preventing substance filling another end of said ink-cartridge opposite said one end so as to block fluid communication between said space and said ink in said ink-cartridge through said another end;
   a liquid retainer, said retainer being impregnated with a second liquid whose vapor pressure is higher than that of said first liquid in said ink-cartridge and being disposed in, and occupying a portion less than all of, said space, whereby vapor of said second liquid evaporated from said retainer fills said closed space so as to prevent evaporation of said first liquid from said ink;
   a cap removably covering said pen point; and
   an elastic sealing member in said cap removably covering said pen point so as to prevent said first liquid from evaporating from said pen point.

2. A writing instrument comprising: a pen point; a tubular holder having peripheral walls; an ink-cartridge containing ink having a first liquid therein, in fluid communication with said pen point disposed within said holder and spaced from said walls so as to define a closed space between said walls and said cartridge surrounding said cartridge; a liquid retainer, said retainer being impregnated with a second liquid whose vapor pressure is higher than that of said first liquid in said ink-cartridge and being disposed in, and occupying a portion less than all of, said space, whereby vapor of said second liquid evaporated from said retainer fills said closed space so as to prevent evaporation of said first liquid from said ink, and a cap removably covering said pen point, said space communicating with the interior of said cap through an opening in said holder adjacent to said pen point that said vapor fills said interior of said cap.

3. A writing instrument as in claim 2, wherein said ink-cartridge is air-tightly closed.

4. A writing instrument as in claim 2, wherein said liquid retainer is disposed so as to cylindrically enclose the outer periphery of said ink-cartridge.

5. A writing instrument as in claim 2, wherein aid holder is transparent and said second liquid impregnating said liquid retainer has a surface tension which is less than 40 dyne/cm at 20° C.

6. A writing instrument as in claim 2, wherein said first liquid comprises a first quantity of a solvent and means including a first quantity of vapor pressure reducing substance, for reducing the vapor pressure of said first quantity of solvent, and said second liquid comprises a second quantity of said solvent and means, including a second quantity of said vapor pressure reducing substance, for reducing the vapor pressure of said second quantity of said solvent, the proportion of said second quantity of said vapor pressure reducing substance to said second quantity of said solvent being less than the proportion of said first quantity of said vapor pressure reducing substance to said first quantity of said solvent, whereby the vapor pressure of said second quantity of solvent is greater than that of said first quantity of said solvent.

7. A writing instrument as in claim 6, wherein said ink is water based ink, said solvent being water, said vapor pressure reducing substance being a hygroscopic agent.

* * * * *